(12) United States Patent
Wu et al.

(10) Patent No.: US 11,166,086 B1
(45) Date of Patent: Nov. 2, 2021

(54) AUTOMATED POST-PRODUCTION EDITING FOR USER-GENERATED MULTIMEDIA CONTENTS

(71) Applicant: WeMovie Technologies, San Ramon, CA (US)

(72) Inventors: Xidong Wu, San Ramon, CA (US); Xiubo Wu, Beijing (CN)

(73) Assignee: WeMovie Technologies, San Ramon, CA (US)

( * ) Notice: Subject to any disclaimer, the term of this patent is extended or adjusted under 35 U.S.C. 154(b) by 0 days.

(21) Appl. No.: 17/082,941

(22) Filed: Oct. 28, 2020

(51) Int. Cl.
  *H04N 21/8543* (2011.01)
  *G06K 9/00* (2006.01)
  *G06N 3/04* (2006.01)

(52) U.S. Cl.
  CPC ..... *H04N 21/8543* (2013.01); *G06K 9/00718* (2013.01); *G06N 3/049* (2013.01)

(58) Field of Classification Search
  CPC . H04N 21/8543; G06K 9/00718; G06N 3/049
  See application file for complete search history.

(56) References Cited

U.S. PATENT DOCUMENTS

| | | | |
|---|---|---|---|
| 9,106,812 | B1 | 8/2015 | Price et al. |
| 2003/0061610 | A1* | 3/2003 | Errico ............... H04N 21/4755 725/46 |
| 2006/0053041 | A1 | 3/2006 | Sakai |
| 2006/0282785 | A1 | 12/2006 | McCarthy et al. |
| 2008/0028318 | A1 | 1/2008 | Shikuma |
| 2008/0036917 | A1 | 2/2008 | Pascarella et al. |
| 2008/0101476 | A1 | 5/2008 | Tian et al. |
| 2009/0063659 | A1 | 3/2009 | Kazerouni et al. |

(Continued)

FOREIGN PATENT DOCUMENTS

| | | |
|---|---|---|
| CA | 3038767 | 10/2019 |
| CN | 101316362 | 12/2008 |

(Continued)

OTHER PUBLICATIONS

Davenport, Glorianna, et al., "Cinematic primitives for multimedia", MIT Media Laboratory, IEEE Computer graphics and Applications, pp. 67-74, Jul. 1991.

(Continued)

*Primary Examiner* — Sunghyoun Park
(74) *Attorney, Agent, or Firm* — Perkins Coie LLP (57) ABSTRACT

Methods, apparatus and systems related to packaging a multimedia content for distribution are described. In one example aspect, a method for performing post-production editing includes receiving one or more footages of an event from at least one user. The method includes constructing, based on information about the event, a script to indicate a structure of multiple temporal units of the one or more footages, and extracting semantic meaning from the one or more footages based on a multimodal analysis comprising at least an audio analysis and a video analysis. The method also includes adding editing instructions to the script based on the structure of the multiple temporal units and the semantic meaning extracted from the one or more footages and performing editing operations based on the editing instructions to generate an edited multimedia content based on the one or more footages.

24 Claims, 8 Drawing Sheets

(56) References Cited

U.S. PATENT DOCUMENTS

| | | |
|---|---|---|
| 2011/0206351 A1 | 8/2011 | Givoly |
| 2011/0249953 A1 | 10/2011 | Suri et al. |
| 2012/0294589 A1 | 11/2012 | Samra et al. |
| 2013/0124984 A1 | 5/2013 | Kuspa |
| 2013/0151970 A1 | 6/2013 | Achour |
| 2013/0166625 A1 | 6/2013 | Swaminathan et al. |
| 2013/0232178 A1 | 9/2013 | Katsambas |
| 2013/0290557 A1 | 10/2013 | Baratz |
| 2014/0082079 A1* | 3/2014 | Dunsmuir ........ H04N 21/21805 709/204 |
| 2014/0132841 A1 | 5/2014 | Beaulieu-Jones et al. |
| 2014/0133834 A1 | 5/2014 | Shannon |
| 2014/0328570 A1* | 11/2014 | Cheng ............. H04N 21/44008 386/241 |
| 2015/0012325 A1 | 1/2015 | Maher |
| 2015/0043892 A1 | 2/2015 | Groman |
| 2015/0082349 A1 | 3/2015 | Ishtiaq et al. |
| 2015/0256858 A1 | 9/2015 | Xue |
| 2015/0261403 A1 | 9/2015 | Greenberg et al. |
| 2015/0281710 A1 | 10/2015 | Sievert et al. |
| 2015/0363718 A1 | 12/2015 | Boss et al. |
| 2015/0379358 A1* | 12/2015 | Renkis ............... G06K 9/00771 348/159 |
| 2016/0027198 A1 | 1/2016 | Terry et al. |
| 2016/0132546 A1 | 5/2016 | Keating |
| 2016/0292509 A1* | 10/2016 | Kaps ...................... A63F 13/00 |
| 2017/0017644 A1 | 1/2017 | Accardo et al. |
| 2017/0048492 A1* | 2/2017 | Buford ................. G11B 27/036 |
| 2017/0169853 A1 | 6/2017 | Hu et al. |
| 2017/0178346 A1* | 6/2017 | Ferro ................... G06K 9/6274 |
| 2017/0337912 A1 | 11/2017 | Caligor et al. |
| 2018/0005037 A1* | 1/2018 | Smith, IV ............... G10L 15/26 |
| 2018/0213289 A1 | 7/2018 | Lee et al. |
| 2019/0045194 A1* | 2/2019 | Zavesky .............. H04N 19/142 |
| 2019/0155829 A1 | 5/2019 | Schriber et al. |
| 2019/0215540 A1 | 7/2019 | Nicol et al. |
| 2019/0356948 A1* | 11/2019 | Stojancic ............. H04N 21/251 |

FOREIGN PATENT DOCUMENTS

| | | |
|---|---|---|
| CN | 101365094 | 2/2009 |
| CN | 101960440 | 1/2011 |
| CN | 104581222 | 4/2015 |
| CN | 108447129 | 8/2018 |
| CN | 109196371 | 1/2019 |
| CN | 109905732 | 6/2019 |
| JP | 2000101647 | 4/2000 |
| WO | 2004105035 A1 | 12/2004 |
| WO | 2008156558 A1 | 12/2008 |

OTHER PUBLICATIONS

International Search Report and Written Opinion dated Mar. 10, 2020 for International Application No. PCT/CN2019/090722, filed on Jun. 11, 2019 (10 pages).

International Search Report and Written Opinion dated May 7, 2020 for International Application No. PCT/CN2019/099534, filed on Aug. 7, 2019 (9 pages).

International Search Report and Written Opinion dated May 27, 2020 for International Application No. PCT/CN2019/109919, filed on Oct. 8, 2019 (11 pages).

International Search Report and Written Opinion dated Aug. 7, 2020 for International Application No. PCT/US2020/032217, filed on May 8, 2020 (10 pages).

\* cited by examiner

AUTOMATED POST-PRODUCTION EDITING FOR USER-GENERATED MULTIMEDIA CONTENTS

TECHNICAL FIELD

This patent document relates to automated post-production editing of user-generated multimedia contents including audios, videos, or multimedia products that include moving images.

BACKGROUND

User-generated content, also known as user-created content, is content that has been posted by users on online platforms. The advent of user-generated content marks a shift from creating online content by media organizations to providing facilities for amateurs to publish their own content. With the rapid development of mobile devices that are capable of capturing content at a variety of time and places and various social media platforms, the amount of user-generated content has increased at a staggering pace.

SUMMARY

Described herein are techniques, subsystems and systems to allow automated post-production editing of user-generated content, thereby enabling amateur users to easily create professionally edited multiple media contents and to distribute the contents among multiple social media platforms. The disclosed techniques can be used by amateurs to automatically organize captured footages from multiple devices according to a timeline of an event and to produce professionally edited content without the need to understand complex editing commands.

In one example aspect, a computer-implemented method for performing post-production editing includes receiving one or more footages of an event from at least one user. The method includes constructing, based on information about the event, a script to indicate a structure of multiple temporal units of the one or more footages, and extracting semantic meaning from the one or more footages based on a multimodal analysis comprising at least an audio analysis and a video analysis. The method also includes adding editing instructions to the script based on the structure of the multiple temporal units and the semantic meaning extracted from the one or more footages and performing editing operations based on the editing instructions to generate an edited multimedia content based on the one or more footages.

In another example aspect, a post-production editing platform includes a user interface configured to receive one or more footages of an event from at least one user. The platform also includes a processor configured to construct, based on information about the event, a script to indicate a structure of multiple temporal units of the one or more footages. The processor is configured to extract semantic meaning from the one or more footages based on at least an audio analysis and a video analysis of the one or more footages, add editing instructions to the script based on the structure of the multiple temporal units and the semantic meaning extracted from the one or more footages, and perform editing operations based on the editing instructions to generate an edited multimedia content based on the one or more footages.

These, and other, aspects are described in the present document.

DETAILED DESCRIPTION

Rapid development of mobile devices and social media platforms has led to a staggering amount of user-generated contents such as videos and other multimedia materials. Yet, the vast majority of the user-generated contents tends to be poorly edited. For example, many amateur video materials may be edited with only a handful of editing effects and significant improvements may be made by additional editing and enhancements. Unlike professionally produced video materials and multimedia contents, amateur user-generated contents often do not come with a carefully prepared production script or a clear storyline. Often times, individuals capture events from different angles spontaneously, resulting in digital video footages that are neither synchronized nor aligned with one another in some aspect. Various available video editing software for amateurs can be limited in terms of editing functions and performance. Professional video editing software programs are pricey and are complex to use. Therefore, post-production editing of user-generated contents from multiple sources continues to be a challenge for amateur users for producing good quality armature videos and multimedia materials.

This patent document discloses techniques that can be implemented in various embodiments to allow fully automated post-production editing of user-generated contents, thereby enabling amateur users to create high quality multiple media contents with ease and with a feel of a professionally edited video. The disclosed techniques can be implemented to provide interactive and iterative editing of the contents using simple user interface controls to achieve the editing effects that are desired by the users.

In some embodiments, the disclosed techniques can be implemented as a post-production editing platform that includes one or more of the following subsystems:

1. User Interface: The post-production editing platform provides a user interface that allows users to upload footages captured using one or more devices. Such an user interface may be structured to enable users to provide some basic information about the captured subject matter, such as the type of the event, the number of devices used to capture the data, and the time and/or location of the event. Such user provided basic information can be subsequently used to facilitate the creation of the desired user edited multimedia contents. The user interface can also be configured to enable users to select a desired editing template based on the nature of the event from different editing templates tailored for different types of events. For example, for a wedding event, the platform can provide several post-production editing templates specifically designed for weddings for the users to choose. Alternatively, or in addition, the platform can select a default template to use based on the information provided by the user.

2. Content Reconstruction: Based on the information provided by the user, the Content Reconstruction part of the post-production editing platform performs preliminary content analysis on the footages to determine the scenes and/or shots structure of the footages according to the timeline.

3. Semantic Analysis: After determining the scene and/or shot structure of the footages, the Semantic Analysis part of the platform can further apply semantic analysis to the footages to obtain details of each scene/shot. For example, audio data can be converted to closed caption of the conversations; facial recognition can be performed to identify main roles that appear in the footages. Based on the scene/shot structure and the results of semantic analysis, the platform can construct a script that outlines the storyline, timeline, roles, and devices involved for capturing the raw data.

4. Automated Post-production Editing: Once the script is constructed, post-production editing can be performed fully automatically by the Automated Post-production Editing Module of the platform. For example, based on the template selected by the user, the Automated Post-production Editing module of the platform can modify the generated script to add appropriate editing instructions. Certain scenes and/or shots can be cut while certain artistic effects can be added as transitions between the scenes.

5. Interactive Refinement: The generated script also provides the flexibility of interactive refinement when the user would like to make custom editing changes to the content that are different from what has been defined in the template. The platform can provide an Interactive Refinement module with simple, or intuitive user interface controls to enable the user to modify the editing effects.

6. Packaging and Release: The edited content can be packaged to appropriate format(s) based on the target social media platforms and distributed accordingly.

The post-production editing platform can be implemented as a stand-alone software program or a web service. Details of the above subsystems are further discussed in connection with FIGS. 1-6 below.

Figure 1:
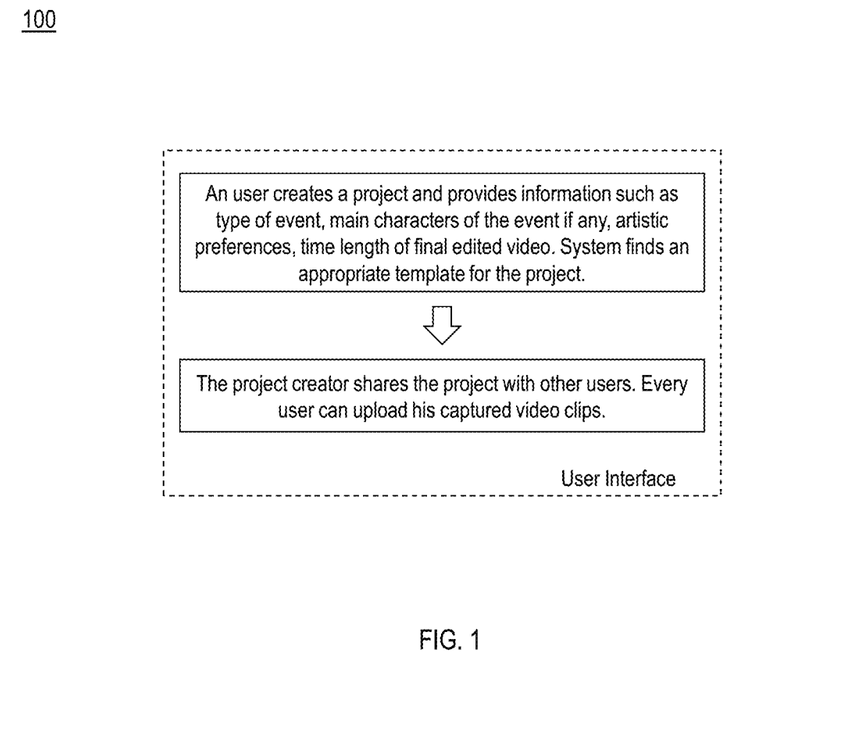
FIG. 1 illustrates an example flow for creating a post-production project using a user interface of an example post-production editing platform in accordance with the present technology.

FIG. 1 illustrates an example flow 100 for creating a post-production project using a user interface of an example post-production editing platform in accordance with the present technology. The platform can provide a user interface (e.g., a web interface or a user interface on a mobile app) to allow a user to create a post-production editing project. During project creation, the user can indicate the subject matter of the project (e.g., information about the event that has been captured) and upload the footages to the platform. For example, the content can be captured for weddings, reunions, family gatherings, community celebrations, etc. The user can be prompted to provide time and/or location at which the content was captured. Alternatively, or in addition, the post-production editing platform can extract such information from metadata of the footages if the metadata is available.

In some embodiments, the platform can perform a quick facial recognition on part of the footages to identify the main characters involved in the event. For example, if the event involves several main characters (e.g., the bride and the groom in a wedding), the platform can analyze part of the footages to identify the bride and the groom. One way to implement this identification is to provide a user interface that enables the user upload photos of the main characters (e.g., the bride and the groom) to allow the platform to apply facial recognition using the faces in the uploaded photos to correctly identify the characters in the videos. In some embodiments, after the platform identifies several main characters, the user can be prompted to provide or input the name of these identified characters.

In some embodiments, the platform can determine an appropriate template for the project based on the information provided by the user. The template can provide a default storyline, along with a set of background music clips and/or artistic effects. In some embodiments, the user can select a template from a set of available templates. The user can also make changes to the template (e.g., replacing music clips or editing effects) either before any of the processing is performed on the footages or after the footages are edited. For an event that does not have a well-defined structure, there may not be any available template. The user can be prompted to provide a structure. For example, the user can provide descriptions for a list of scenes based on time sequence and different locations of the event.

Once the project is created, the user can also invite other users to participate the project, e.g., inviting friends or family members to the project so that the invited friends or family members can upload additional content captured from different devices. The platform can determine the number of devices used to produce the contents based on the number of user uploads and/or the metadata associated with the footages.

Figure 2:
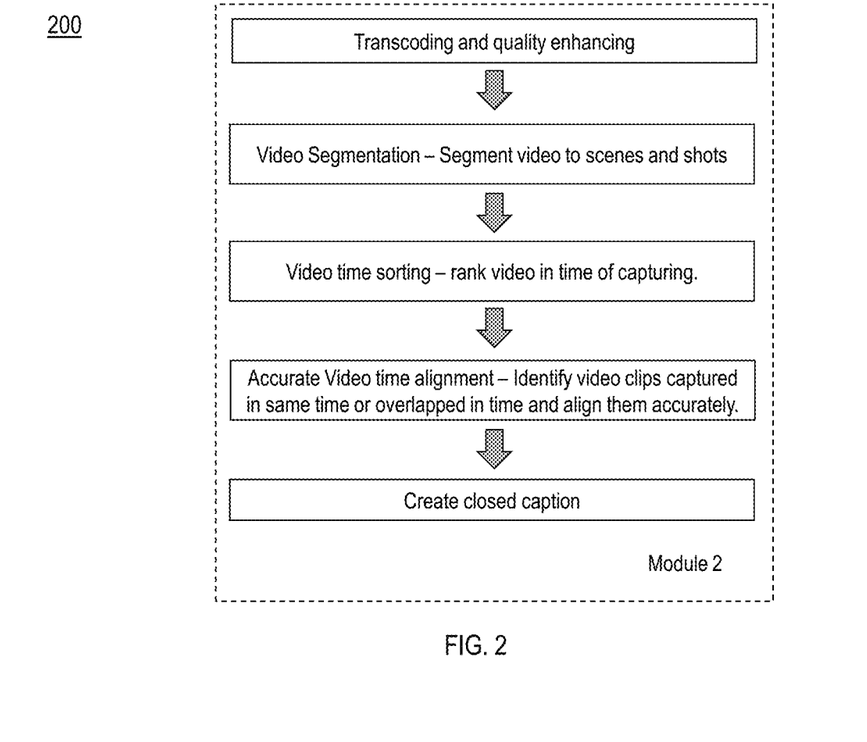
FIG. 2 illustrates an example flow for performing content reconstruction by an example post-production editing platform in accordance with the present technology.

FIG. 2 illustrates an example flow 200 for performing content reconstruction by an example post-production editing platform in accordance with the present technology. As discussed above, the footages can be captured by different users using different devices. Often times, different video codecs and/or different resolutions have been used in producing these footages due to the differences between devices. It is thus necessary to perform transcoding to video footages from difference devices to convert the different video footages into transcoded video footages based the same codecs and/or resolution, so that they can be organized in a uniform manner for the project. The platform can also perform quality enhancement processing steps to reduce and/or remove shaking or jittering artifacts in the videos. In some embodiments, video clips with very poor quality can be discarded by the platform.

As part of the content reconstruction, the platform then performs video segmentation to divide the footages into smaller segments in the temporal unit of shots and/or scenes. A shot is a sequence of frames shot uninterruptedly by one camera. Multiple shots that are produced at the same location and/or time are grouped into a scene. The platform can perform shot transition detection to determine any abrupt or gradual transitions in the content and split the footages into shots. The platform can further adopt different algorithms, such as content-aware detection and/or threshold detection, to determine whether a scene change has occurred so as to group relevant shots in the same scene. A tree-structure that includes multiple scenes, each scene including multiple shots, can be constructed to represent the footages.

Figure 3:
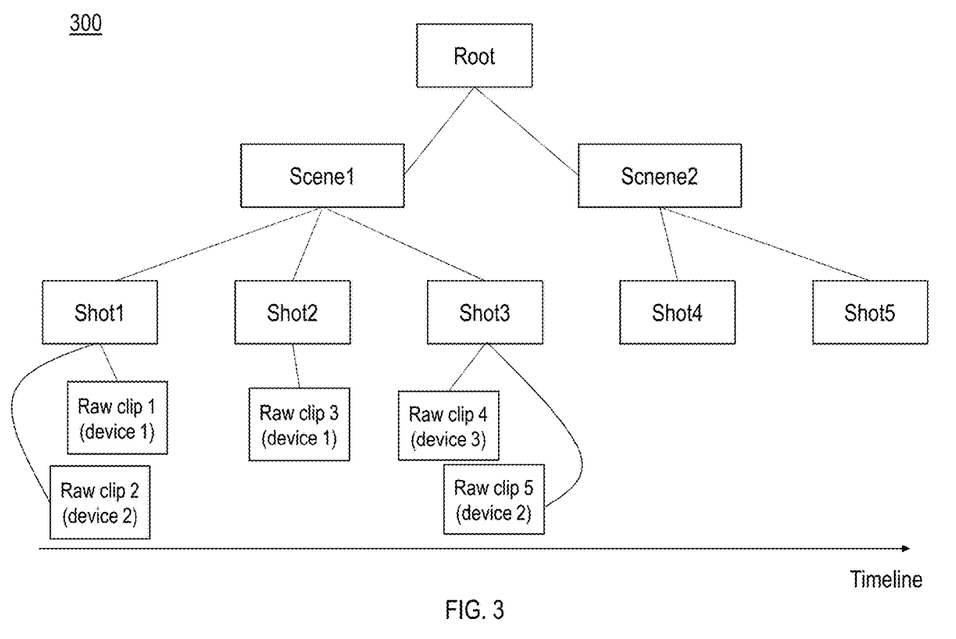
FIG. 3 illustrates an example structure of a footage in accordance with the present technology.

FIG. 3 illustrates an example structure 300 of a footage in accordance with the present technology. In this example, the footage includes two main scenes, each comprising multiple shots. Each of the temporal unit (e.g., shot and/or scene) in the structure can be assigned a time domain value. Based on the metadata included in the footages, as well as the information provided by the user(s), the platform can determine a start time and end time for each of the temporal unit. Different shots and/or scenes in footages provided by different users (or captured by different devices) can be aligned along the time-domain. Shots that have been captured around the same time can be associated with each other. For example, as shown in FIG. 3, raw clip 1 from device 1 and raw clip 2 from device 2 were captured around the same time. The post-production editing platform can also determine that the clips are related to the same content. That is, these are the clips correspond to the same character(s)/moment(s) taken from different devices from different angles. The clips are marked to be associated with the same shot. Similarly, raw clip 4 from device 3 and raw clip 5 from device 2 overlap at least partially in the time domain. They are also different clips that capture the same character(s) and/or moment(s). Thus, both these clips are associated with shot 3.

In some embodiments, the time information provided by the users can be inaccurate. Also, the time information included in the metadata may not match perfectly as the devices were not synchronized. The platform can perform preliminary object/character/gesture recognition to align the shots based on the content of the shots (e.g., when the same character or the same gesture appeared in two different video clips). Furthermore, audio data can be used to align the shots in time domain. When the same sound appears at slightly different time points in different clips, the platform can synchronize the clips and/or shots based on the occurrence of the sound.

The platform can start to build a script based on the preliminary information and time-domain alignment/synchronization. Table 1 shows an example initial script constructed by the post-production editing system corresponding to the structure shown in FIG. 3.

TABLE 1

Example Initial Script

```
<movie>
  <title>Wedding </title>
    <scene id=1>
    <duration unit=minute>15</duration>
    <location>
        <city>San Francisco</city>
        <latitude>120000</latitude>
        <longitude>120000</ longitude>
        <location type>outdoor</location type>
        <address>...</address>
    </location>
    <casts>
        <actor>Groom</actor>
        <actress>Bride</actress>
        ...
    </casts>
    <cameras>
        ...
    </cameras>
```

TABLE 1-continued

Example Initial Script

```
<scene id=1>
  <shot id=1>
     <start time>0:0:0</start time>
     <end time>0:0:16</end time>
     <camera id=1>
        <start time>0:0:2</start time>
        <end time>0:0:16</end time>
        <URL>http://example.com/movies/wedding/sce1-
        shot1-camera1.mp4</URL>
     </camera>
     <camera id=2>
        <start time>0:0:0</start time>
        <end time>0:0:13</end time>
        <URL>http://example.com/movies/wedding/sce1-
        shot1-camera2.mp4</URL>
     </camera>
  </shot>
  ...
  <shot id=2>
  </shot>
  ...
  <shot id=3>
  </shot>
</scene>
...
</movie>
```

As most amateur productions do not have predefined storylines or production scripts, the users lack a clear outline to organize the contents for editing purposes. The script generated by the post-production editing platform offers the users a top-level overview of the contents and the relationships between contents captured by different devices, thereby facilitating subsequent editing operations to be performed on the contents.

Figure 4:
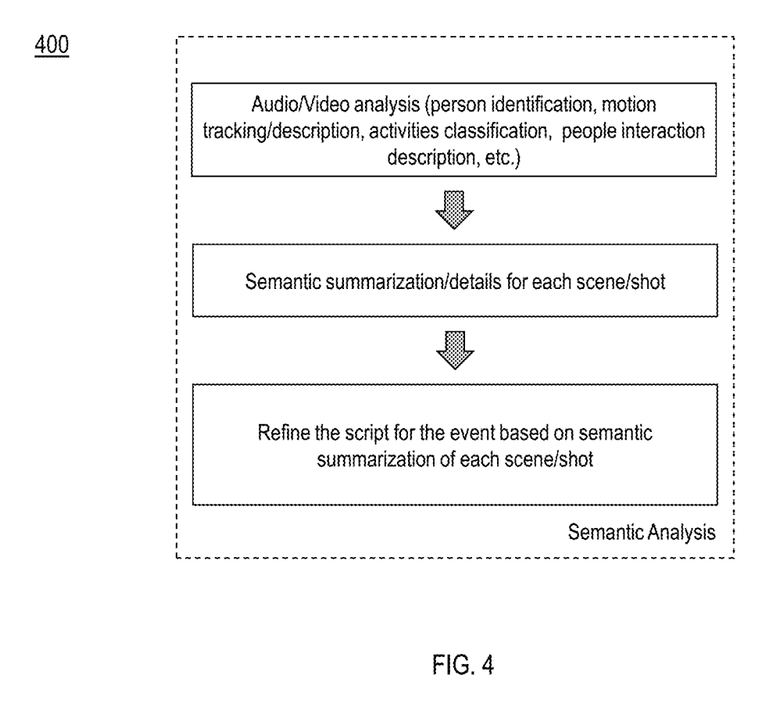
FIG. 4 illustrates an example flow for performing semantic analysis by an example post-production editing platform in accordance with the present technology.

FIG. 4 illustrates an example flow 400 for performing semantic analysis by an example post-production editing platform in accordance with the present technology. Based on the scene/shot structure and preliminary analysis results, the post-production editing platform can perform in-depth semantic analysis of the shots and/or scenes to further identify the roles, classify the activities, track motion or movements performed by the characters, etc. The platform can perform multi-modal analysis (e.g., audio and video) based on Natural Language Processing (NLP) algorithms and machine learning algorithms in computer vision and/or video processing areas to further obtain information about the contents.

For example, audio and text analysis using NLP algorithms can be adopted to classify speech and extract key words. The audio data can be converted into closed caption using voice recognition techniques. Audio analysis can also extract non-verbal information such as applauding, cheering, and/or background music or sound.

In some embodiments, besides the preliminary facial recognition and/or object detection operations, computer vision technologies can be used to identify actions and motions accurately. For example, techniques such as optical flow can be used to track human action and/or object movements. Based on the information provided by the user (e.g., the nature of the events, the location at which the footages were captured, etc.) and the recognized objects/characters, sequential actions that have been identified can be linked to form a semantic context. The shots and/or scenes associated with the actions can then be provided with corresponding semantic labels. For example, given a well-defined scene, such as the vow exchange at a wedding, the actions performed by the characters can be labeled with corresponding semantic meanings with high confidence. For scenes that do not have well-defined structures and/or semantic contexts, the system can indicate that the derived semantic meaning is given a low confidence level. The user can be prompted to refine or improve the semantic labeling of the actions/scenes for those scenes.

In some embodiments, one or more neural networks can be trained to provide more accurate context labeling for scenes/shots. Different domain-specific networks can be used for scenes that are well-defined (e.g., weddings, performances, etc.) as well as scenes that lack well-defined structures (e.g., family picnic). In particular, a recurrent neural network (RNN) is a class of artificial neural networks that form a directed graph along a temporal sequence. In some embodiments, a domain-specific RNN (e.g., for wedding events) can be trained to provide semantic meaning for certain shots/scenes in wedding footages. Another domain-specific RNN (e.g., for picnics) can be trained to label certain shots/scenes in footages that capture family picnics. The RNNs can first be trained offline using a small set of training data with predefined correspondence between actions (e.g., an applause following a speech, a laughter after a joke). Online training can further be performed on the RNNs based on feedback from the user. For example, once the system derives a semantic meaning with a low confidence level, the user can be prompted to provide correction and/or refinement of the semantic meaning. The user input can be used to further train the model to achieve higher accuracy for subsequent processing.

The results of the semantic analysis can be summarized to supplement the initial script generated by the platform. Table 2 shows an example script with semantic information in accordance with the present technology. Additions and/or updates to the initial script based on semantic analysis results are underlined.

TABLE 2

Example Script with Semantic Information

```
<movie>
    <title>Wedding </title>
        <scene id=1>
    <duration unit=minute>15</duration>
    <location>
        <city>San Francisco</city>
        <latitude>120000</latitude>
        <longitude>120000</ longitude>
        <location type>outdoor</location type>
        <address>...</address>
    </location>
    <casts>
        <actor>Groom</actor>
        <actress>Bride</actress>
        ...
    </casts>
    <cameras>
        ...
    </cameras>
    <scene id=1>
    <shot id=1>
        <start time>0:0:0</start time>
        <end time>0:0:16</end time>
        <actionid=1>BrideandGroomwalkingforward</action>
        <music>
            <id>12</id>
            <type>background</type>
            <action>play</action>
        </music>
        <camera id=1>
            <start time>0:0:2</start time>
            <end time>0:0:16</end time>
```

TABLE 2-continued

Example Script with Semantic Information

```
            <URL>http://example.com/movies/wedding/sce1-
            shot1-camera1.mp4</URL>
        </camera>
        <camera id=2>
            <start time>0:0:0</start time>
            <end time>0:0:13</end time>
            <URL>http://example.com/movies/wedding/sce1-
            shot1-camera2.mp4</URL>
        </camera>
    </shot>
    ...
    <shot id=3>
        <start time>0:0:16</start time>
        <end time>0:0:20</end time>
        <actionid=2>GroomturnedtoBride</action>
        <linespeaker='Groom'>Todayisabeautifulday.</line>
    </shot>
    ...
    <shot id=4>
    </shot>
</scene>
...
</movie>
```

In some embodiments, based on the type of the event, the template can pre-define one or more scenes with corresponding semantic meanings that can be matched to the captured content. For example, for a wedding event, the template can define a default scene for the speech of the groom's father. The scene can come with predefined semantic information. After performing the audio and video analysis, the platform can match the shots and/or clips to the predefined speech scene and update the script accordingly.

Figure 5:
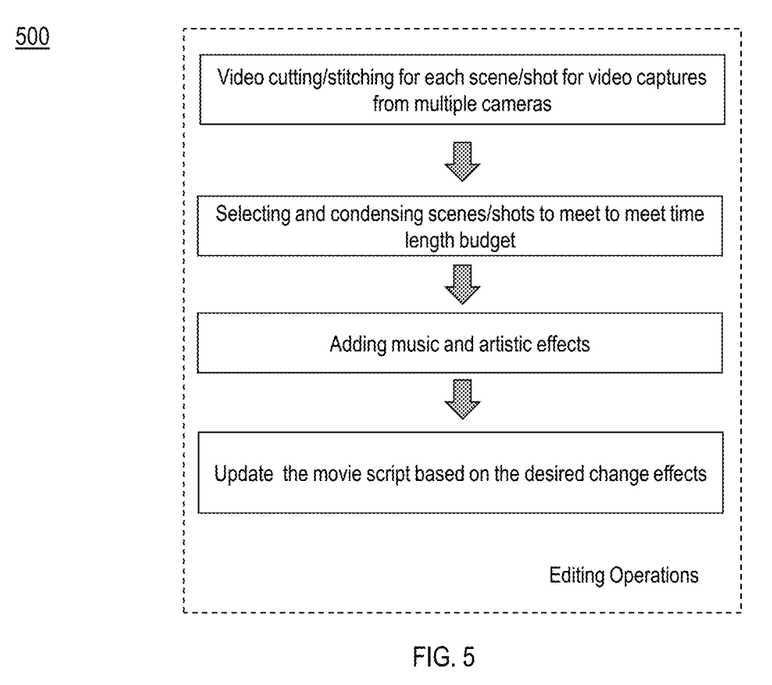
FIG. 5 illustrates an example flow for performing editing operations by an example post-production editing platform in accordance with the present technology.

FIG. 5 illustrates an example flow 500 for performing editing operations by an example post-production editing platform in accordance with the present technology. Given the metadata information for the project and the generated script, the post-production editing platform can further define editing operations, such as shot/scene cutting and/or transitions effects. Appropriate background music can also be added to the footages.

In some embodiments, the script can be further modified to include the editing operations to be performed to the footages. For example, shots can be cut for each scene; multiple clips from different devices can be stitched. In addition to the cutting/editing locations determined based on the template, the post-production editing platform can determine whether there are dramatic changes in the footage indicating "dramatic moments," which can be potential cut positioning to further cut/edit the footage.

In some embodiments, the lengths of the scenes can be adjusted according to the desired length of the entire content. The original background music or sound can be replaced by different sound effects. Transition effects between the scenes can also be added to the script. Table 3 shows an example script with editing operations in accordance with the present technology. The example changes to the script and editing operations are underlined in Table 3.

TABLE 3

Example Script with Editing Operations

```
<movie>
    <title>Wedding </title>
        <scene id=1>
    <transition>fadein</transition>
    <duration unit=minute>15</duration>
```

TABLE 3-continued

Example Script with Editing Operations

```
<location>
    <city>San Francisco</city>
    <latitude>120000</latitude>
    <longitude>120000</ longitude>
    <location type>outdoor</location type>
    <address...</address>
</location>
<casts>
    <actor>Groom</actor>
    <actress>Bride</actress>
    ...
</casts>
<cameras>
    ...
</cameras>
<scene id=1>
<shot id=1>
    <start time>0:0:0</start time>
    <end time>0:0:16</end time>
    <action id=1>Bride and Groom walking forward</action>
    <music>
        <id>16</id>
        <type>romantic</type>
        <action>play</action>
    </music>
    <camera id=1>
        <start time>0:0:2</start time>
        <end time>0:0:16</end time>
        <URL>http://example.com/movies/wedding/sce1-
        shot1-camera1.mp4</URL>
    </camera>
    <camera id=2>
        <start time>0:0:0</start time>
        <end time>0:0:13</end time>
        <URL>http://example.com/movies/wedding/sce1-
        shot1-camera2.mp4</URL>
    </camera>
    <cuttype='match'>camera2</cut>
</shot>
    ...
<shot id=3>
    <start time>0:0:16</start time>
    <end time>0:0:20</end time>
    ...
    <action id=2>Groom turned to Bride</action>
    <line speaker='Groom'>Today is a beautiful day. </line>
    <cuttype='jump'>camera2</cut>
</shot>
    ...
<shot id=4>
</shot>
<transition>dissolve</transition>
</scene>
...
</movie>
```

Based on information in the script, the platform performs editing of the footages accordingly. In some embodiments, the platform can implement a cloud-based film editing system (CFES) to perform a range of editing operations in a fully automated multimedia editing platform to enable automatic editing according to a storyline that is represented as a machine-readable script. Details regarding the CFES are described in International Application No. PCT/US2020/032217, entitled "Fully Automated Post-Production Editing for Movies, TV Shows, and Multimedia Contents," filed on May 8, 2020, which is incorporated by reference by its entirety. One of the examples editing systems disclosed in the above cited application is a system for performing post-production editing that includes one or more processors, and one or more memories including processor executable code. The processor executable code, upon execution by the one or more processors, is operable to configure the one or more processors to receive one or more machine-readable scripts corresponding to one or more scenes of a storyline. The one or more machine-readable scripts include information about multimodal data and editing instructions for each of the one or more scenes. The one or more processors are configured to receive multiple streams of multimedia content corresponding to the one or more scenes, identify at least one change in an audio or video feature in the multiple streams of multimedia content based on the multimodal data for each of the one or more scenes, edit the multiple streams of multimedia content based on the editing instructions and selectively based on the identified change, and generate a final stream of multimedia content based on the edited multiple streams.

Figure 6:
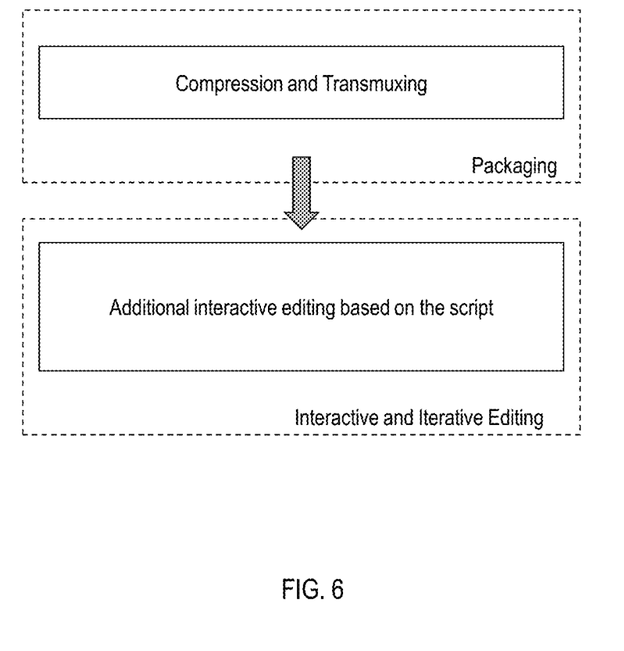
FIG. 6 illustrates an example flow for performing packaging and distribution by an example post-production editing platform in accordance with the present technology.

Once the footages are edited, the edited content can be packaged and distributed to a target platform. FIG. 6 illustrates an example flow 600 for performing packaging and distribution by an example post-production editing platform in accordance with the present technology. The edited multimedia content can be encoded into different formats, such as Flash (.f4v), Moving Picture Experts Group (MPEG) 4 (mp4), or QuickTime (.mov). To facilitate distribution of the edited convents on various online social media platforms, techniques such as adaptive streaming are used to maximize viewing experiences by applying different compression levels according to network conditions. Transmuxing can also be performed to package the compression encoded media stream into a container for online streaming. Because the post-production editing system has constructed a script based on the structure and the semantic meaning of the footages, content structure aware packaging can be performed on the edited contents. Details regarding content-structure-aware packaging and distribution can be found in U.S. patent application Ser. No. 17/004,383, entitled "Content Structure Aware Multimedia Streaming Service for Movies, TV Shows and Multimedia Contents," filed on Aug. 27, 2020, which is incorporated by reference by its entirety.

In some embodiments, prior to the content being distributed to various social media platforms, the user may desire to make additional changes to the editing effects. At this stage, the user can be presented with the complete script, which includes the editing instructions as well as the structure of the content. The script also shows how different clips/shots are interrelated to form the edited content. The user now has the option to use simple user interface controls (e.g., selections between different transition types, selections between different angles of the footages) to modify the editing effects without the need to possess professional knowledge about video editing or software programs. The platform can provide a revised version of the edited content based on control input so that the editing operations can be performed in an interactive and iterative manner. In some embodiments, instead of using the provided user interface controls, the user can manually edit the script to incorporate the desired editing effects. The system updates the edited content according to the changes in the script to provide timely feedback to the user.

Figure 7:
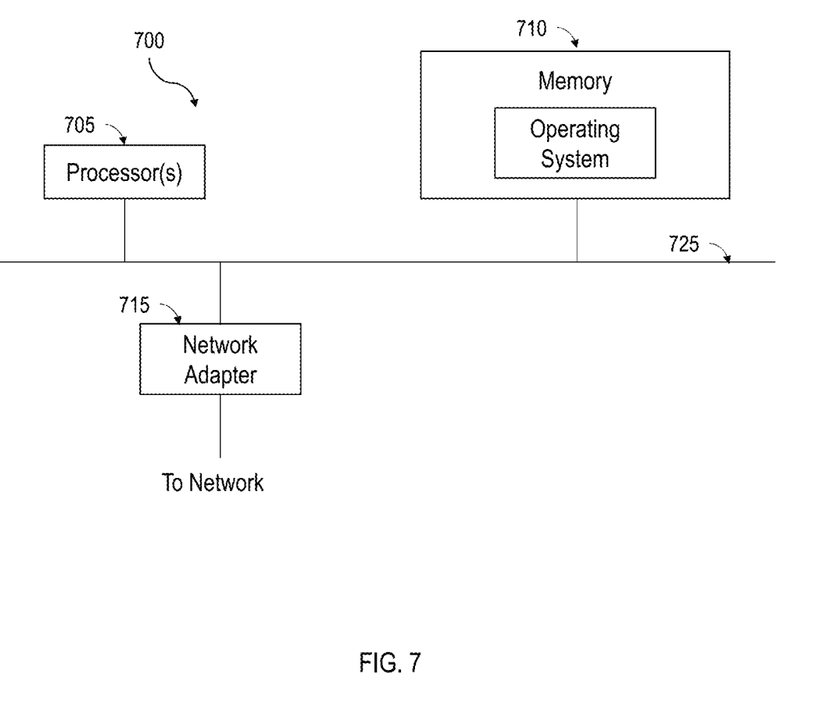
FIG. 7 is a block diagram illustrating an example of the architecture for a computer system or other control device that can be utilized to implement various portions of the presently disclosed technology.

FIG. 7 is a block diagram illustrating an example of the architecture for a computer system or other control device 700 that can be utilized to implement various portions of the presently disclosed technology (e.g., processor(s) to perform transcoding or transmuxing). The computer system 700 includes one or more processors 705 and memory 710 connected via an interconnect 725. The interconnect 725 may represent any one or more separate physical buses, point to point connections, or both, connected by appropriate bridges, adapters, or controllers. The interconnect 725, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 705 may include central processing units (CPUs) to control the overall operation of, for example, the host computer. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 710 can be or include the main memory of the computer system. The memory 610 represents any suitable form of random access memory (RAM), read-only memory (ROM), flash memory, or the like, or a combination of such devices. In use, the memory 710 may contain, among other things, a set of machine instructions which, when executed by processor 705, causes the processor 705 to perform operations to implement embodiments of the presently disclosed technology.

Also connected to the processor(s) 705 through the interconnect 725 is a (optional) network adapter 715. The network adapter 715 provides the computer system 700 with the ability to communicate with remote devices, such as the storage clients, and/or other storage servers, and may be, for example, an Ethernet adapter or Fiber Channel adapter.

Figure 8:
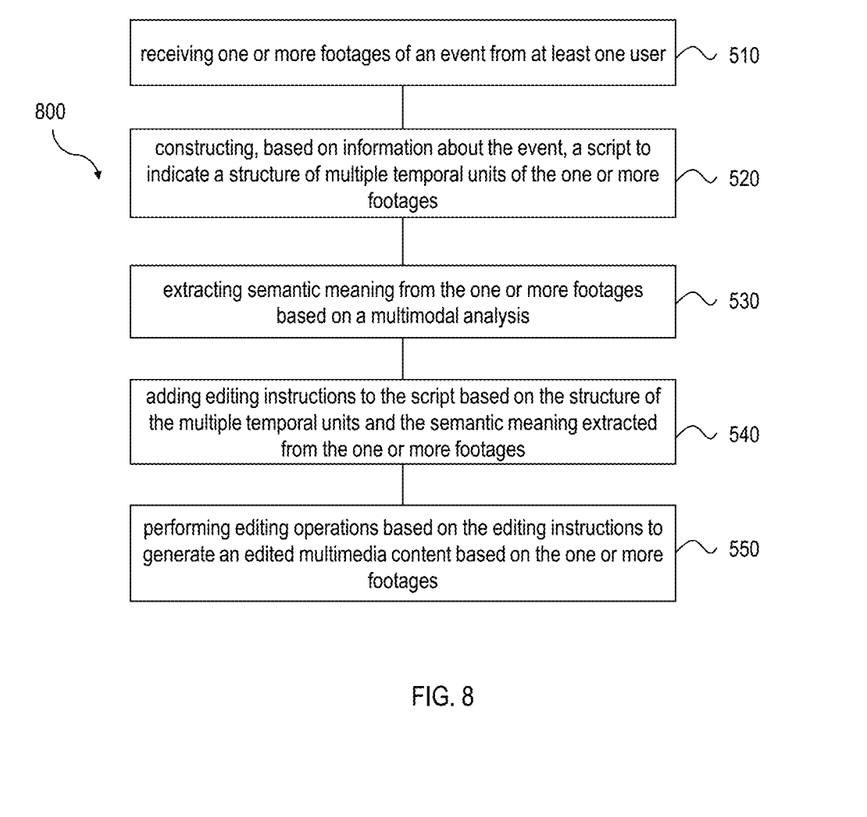
FIG. 8 is a flowchart representation of a method for performing post-production editing in accordance with the present technology.

FIG. 8 is a flowchart representation of a method 800 for performing post-production editing in accordance with the present technology. The method 800 includes, at operation 810, receiving one or more footages of an event from at least one user. The method 800 includes, at operation 820, constructing, based on information about the event, a script to indicate a structure of multiple temporal units of the one or more footages. Here, a temporal unit can include a shot or a scene. The method 800 includes, at operation 830, extracting semantic meaning from the one or more footages based on a multimodal analysis comprising at least an audio analysis and a video analysis. The method 800 includes, at operation 840, adding editing instructions to the script based on the structure of the multiple temporal units and the semantic meaning extracted from the one or more footages. The method 800 also includes, at operation 850, performing editing operations based on the editing instructions to generate an edited multimedia content based on the one or more footages.

In some embodiments, the method includes presenting, to a user via a user interface, the script and the edited multimedia content; receiving input from the user via the user interface to update at least part of the script; and generating a revised version of the edited multimedia content based on the updated script in an iterative manner.

In some embodiments, the method includes extracting information about time or location at which the event has been captured based on metadata embedded in the one or more footages. In some embodiments, the structure of the multiple temporal units specifies that a scene includes multiple shots, and one or more clips from at least one device correspond to a same shot. In some embodiments, the method includes assigning a time domain location for each of the multiple temporal units of the one or more footages and aligning corresponding temporal units based on the time domain location. In some embodiments, the method also includes identifying one or more characters or one or more gestures in the one or more footages and refining the aligning of the corresponding temporal units based on the identified one or more characters or the identified one or more gestures.

In some embodiments, the method includes extracting text or background sound from the one or more footages based on the audio analysis and modifying the script to include the extracted text or the background sound. In some embodiments, the method includes replacing the background sound using an alternative sound determined based on the semantic meaning of the one or more footages.

In some embodiments, the semantic meaning comprises an association between some of the one or more characters that is determined based on the video analysis of the one or more footages. In some embodiments, the method includes packaging the edited multimedia content based on a target online media platform and distributing the packaged multimedia content to the target online media platform.

The above examples demonstrate that the techniques and systems disclosed in this patent document can be adopted widely to produce professionally edited multimedia contents based on user-captured content using multiple devices. Instead of performing a one-stop automated editing operation, the disclosed system aims to reconstruct a professional production structure (e.g., a reconstructed production script) from raw UGC contents so as to enable content editing at the professional level. The reconstructed script allows the users to quickly understand the correspondence between the shot/scene, the editing effects, and different media files, thereby enabling the users to iteratively make appropriate editing choices if so desired.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, machine-readable script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A computer-implemented method for performing post-production editing of digital video footages or digital multimedia footages, comprising:
   receiving one or more footages of an event captured by at least one user device;
   determining multiple temporal units of each of the one or more footages, wherein a temporal unit comprises a shot or a scene;
   constructing, based on information about the event, a script to indicate a structure of the multiple temporal units of the one or more footages, the script comprising at least a start time and an end time for each of the multiple temporal units of the one or more footages, wherein the constructing comprises:
      assigning a time-domain location for each of the multiple temporal units of the one or more footages,
      aligning different temporal units captured by different devices according to assigned time-domain locations for the different temporal units,
      refining the aligning of the different temporal units based on one or more characters or one or more gestures identified in the one or more temporal units, and
      determining the start time and the end time for each of the multiple temporal units based on the refining of the aligning of the different temporal units;
   extracting semantic meaning from the one or more footages based on a multimodal analysis comprising at least an audio analysis and a video analysis;
   adding editing instructions to the script based on the structure of the multiple temporal units and the semantic meaning extracted from the one or more footages; and
   performing editing operations based on the editing instructions to generate an edited multimedia content based on the one or more footages.

2. The method of claim 1, comprising:
   presenting, to a user via a user interface, the script and the edited multimedia content;
   receiving input from the user via the user interface to update at least part of the script in response to the input from the user; and
   generating a revised version of the edited multimedia content based on the updated script in an iterative manner.

3. The method of claim 1, comprising:
   extracting information about time or location at which the event has been captured based on metadata embedded in the one or more footages.

4. The method of claim 1, wherein the structure of the multiple temporal units comprises a tree structure specifying multiple scenes, wherein each scene includes multiple shots.

5. The method of claim 1, comprising:
   extracting text or background sound from the one or more footages based on the audio analysis; and
   modifying the script to include the text or the background sound.

6. The method of claim 5, further comprising:
   replacing the background sound using an alternative sound determined based on the semantic meaning of the one or more footages.

7. The method of claim 1, wherein the semantic meaning comprises an association between some of the one or more characters that is determined based on the video analysis of the one or more footages.

8. The method of claim 1, wherein the semantic meaning comprises an association between actions performed by some of the one or more characters that is determined based on the video analysis of the one or more footages.

9. The method of claim 1, wherein the extracting of the semantic meaning comprises:
identifying one or more characters in the one or more footages;
identifying, based on the one or more footages, one or more actions performed by the one or more characters; and
establishing, using a neural network, an association between at least part of the one or more actions based on the information about the event.

10. The method of claim 9, wherein the extracting of the semantic meaning further comprises:
adjusting the association between the at least part of the one or more actions using feedback from a user.

11. The method of claim 9, wherein the neural network comprises a recurrent neural network.

12. The method of claim 1, comprising:
packaging the edited multimedia content based on a target online media platform; and
distributing the packaged multimedia content to the target online media platform.

13. A post-production editing platform, comprising:
a user interface configured to receive one or more footages of an event from at least one user device; and
a processor configured to:
construct, based on information about the event, a script to indicate a structure of multiple temporal units of the one or more footages, wherein a temporal unit comprises a shot or a scene wherein the script comprises at least a start time and an end time for each of the multiple temporal units, and wherein the script is constructed by:
assigning a time-domain location for each of the multiple temporal units of the one or more footages,
aligning one or more temporal units captured by different devices according to the assigned time-domain location,
refining the aligning of the one or more temporal units based on one or more characters or one or more gestures identified in the one or more temporal units, and
determining the start time and the end time for each of the multiple temporal units based on the refining;
extract semantic meaning from the one or more footages based on at least an audio analysis and a video analysis of the one or more footages;
add editing instructions to the script based on the structure of the multiple temporal units and the semantic meaning extracted from the one or more footages; and
perform editing operations based on the editing instructions to generate an edited multimedia content based on the one or more footages.

14. The post-production editing platform of claim 13, wherein the user interface is configured to present the script and the edited multimedia content to a user, the user interface further configured to receive input from the user to update the script, and
wherein the processor is configured to generate a revised version of the edited multimedia content based on the updated script to enable iterative editing of the one or more footages by the user.

15. The post-production editing platform of claim 13, wherein the processor is configured to extract information about time or location at which the event has been captured based on metadata embedded in the one or more footages.

16. The post-production editing platform of claim 13, wherein the structure of the multiple temporal units comprises a tree structure specifying multiple scenes, wherein each scene includes multiple shots.

17. The post-production editing platform of claim 13, wherein the processor is configured to:
extract text or background sound from the one or more footages based on the audio analysis; and
modify the script to include the text or the background sound.

18. The post-production editing platform of claim 13, wherein the semantic meaning comprises an association between some of the one or more characters that is determined based on the video analysis of the one or more footages.

19. The post-production editing platform of claim 13, wherein the semantic meaning comprises an association between actions performed by some of the one or more characters that is determined based on the video analysis of the one or more footages.

20. The post-production editing platform of claim 13, wherein the processor is configured to extract of the semantic meaning based on:
identifying one or more characters in the one or more footages;
identifying, based on the one or more footages, one or more actions performed by the one or more characters; and
establishing, using a neural network, an association between at least part of the one or more actions based on the information about the event.

21. The post-production editing platform of claim 20, wherein the processor is configured to adjust the association between the at least part of the one or more actions using feedback from a user.

22. The post-production editing platform of claim 19, wherein the neural network comprises a recurrent neural network.

23. The post-production editing platform of claim 13, wherein the processor is configured to package and distribute the edited multimedia content to one or more online media platforms.

24. The post-production editing platform of claim 13, wherein at least part of which is implemented as a web service.

* * * * *

UNITED STATES PATENT AND TRADEMARK OFFICE
CERTIFICATE OF CORRECTION

PATENT NO. : 11,166,086 B1
APPLICATION NO. : 17/082941
DATED : November 2, 2021
INVENTOR(S) : Wu et al.

It is certified that error appears in the above-identified patent and that said Letters Patent is hereby corrected as shown below:

In the Drawings

In Fig. 1, Sheet 1 of 8, in Line 1, delete "An user" and insert -- A user --, therefor.

In Fig. 3, Sheet 3 of 8, in Line 2, and on the title page, in the print figure, delete "Scnene2" and insert -- Scene2 --, therefor.

In the Specification

Column 1, Line 21, delete "time" and insert -- times --, therefor.

Column 3, Line 2, delete "an user" and insert -- a user --, therefor.

Column 3, Line 33, delete "for" and insert -- in --, therefor.

Column 4, Line 36, delete "the" and insert -- in the --, therefor.

Column 4, Line 51, delete "difference" and insert -- different --, therefor.

Column 4, Line 52, delete "based the" and insert -- based on the --, therefor.

Column 5, Line 22, delete "clips correspond" and insert -- clips that correspond --, therefor.

Column 8, Line 43, delete "to" and insert -- on --, therefor.

Column 9, Line 8, delete "<address ... </ address>" and insert -- <address> ... </ address> --, therefor.

Column 9, Line 61, delete "examples editing" and insert -- examples of editing --, therefor.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,166,086 B1

In the Claims

Column 15, Line 31, Claim 13, delete "scene" and insert -- scene, --, therefor.

Column 16, Line 32, Claim 20, delete "extract of" and insert -- extract --, therefor.